United States Patent [19]
Fedyk et al.

[11] Patent Number: 5,848,055
[45] Date of Patent: Dec. 8, 1998

[54] BANDWIDTH CORRELATION MEANS FOR PATHS IN CONNECTION-ORIENTED PACKET SWITCHING NETWORKS

[75] Inventors: Donald W. Fedyk, Nepean; Peter J. Ashwood-Smith, Hull; Darek R. Skalecki, Nepean, all of Canada

[73] Assignee: Northern Telecom Limited, Montreal, Canada

[21] Appl. No.: 746,996

[22] Filed: Nov. 19, 1996

[51] Int. Cl.[6] .................................................... H04J 3/16
[52] U.S. Cl. ........................ 370/228; 370/237; 370/468
[58] Field of Search ................................ 370/351, 357, 370/360, 384, 386, 389, 392, 400, 401, 402, 403, 404, 405, 409, 410, 465, 468, 431, 437, 216, 225, 226, 227, 228, 229, 235, 236, 237, 238; 340/827

[56] References Cited

U.S. PATENT DOCUMENTS

| | | |
|---|---|---|
| 4,736,363 | 4/1988 | Aubin et al. . |
| 4,870,641 | 9/1989 | Pattavina . |
| 4,979,165 | 12/1990 | Dighe et al. . |
| 5,130,982 | 7/1992 | Ash et al. ................................ 370/468 |
| 5,164,938 | 11/1992 | Jurkevich et al. . |
| 5,265,091 | 11/1993 | Van Landegem . |
| 5,347,511 | 9/1994 | Gun . |
| 5,349,580 | 9/1994 | Hester et al. . |
| 5,355,347 | 10/1994 | Hester et al. . |
| 5,425,019 | 6/1995 | Chugo et al. . |
| 5,497,371 | 3/1996 | Ellis et al. . |
| 5,517,500 | 5/1996 | White et al. . |

FOREIGN PATENT DOCUMENTS 0276349 8/1988 European Pat. Off. .

OTHER PUBLICATIONS

N. Endo, T. Kozaki, T. Ohuchi, H. Kuwahara, S. Gohara. Shared Buffer Memory Switch for an ATM Exchange. 41(1993) Jan., No. 1 pp. 237–244.

Y. Sakurai, N. Ido, S. Gohara, N. Endo. Large–Scale ATM Multistage Switching Netowrk with Shared Buffer Memory Switches. Jan. 1991 pp. 90–96.

*Primary Examiner*—Huy D. Vu

[57] ABSTRACT

An alternate path can be established in a connection-oriented packet switching network by correlating the bandwidth reservation of this alternate path with the bandwidth reservation of an active path on trunks through which both paths pass. The alternate path that is established can have one or more of a number of different attributes that vary from the attributes of the active path. The alternate path is established in a connection-oriented network with bandwidth correlation in three stages: a keying stage, a correlation stage and, a transfer stage. An alternate path may be established without a double reservation of bandwidth, thus making efficient use of limited network resources.

12 Claims, 9 Drawing Sheets

FIG. 6  FT = FORWARDING TABLE

FT = FORWARDING TABLE
CT = CORRELATION TABLE

FIG. 13  FT = FORWARDING TABLE

5,848,055

BANDWIDTH CORRELATION MEANS FOR PATHS IN CONNECTION-ORIENTED PACKET SWITCHING NETWORKS

FIELD OF THE INVENTION

This invention relates to bandwidth correlation means for connection-oriented packet switching networks, and more particularly to a means for correlating the bandwidth reservation of one path to the bandwidth reservation of another distinct path on trunks through which both paths pass.

BACKGROUND OF THE INVENTION

In a connection-oriented packet switching network, also known as a path-oriented routing network, the entire path for a data packet (comprising both voice and digitized data) is determined when a connection is set up and is fixed for the duration of the connection. Examples of such networks are Asynchronous Transfer Mode (ATM) and Systems Network Architecture (SNA) networks. Typically in such networks, network management information is transmitted throughout the path to maintain control over network features and path selection, and to promote network efficiency.

During path establishment in connection-oriented packet switching networks, bandwidth for a connection path through the network is reserved in advance on all trunks on a trunk-by-trunk basis from source to destination. The reserved bandwidth can be set to the service peak, average, or any other arbitrary bandwidth usage required by the connection. Bandwidth can be allocated in a statistical fashion by reserving only a portion of the bandwidth required for the connection or in a conservative fashion by reserving the peak bandwidth requirements.

Bandwidth reservation ensures that there will always be enough trunk bandwidth to send data on the trunk. That is, it is a means of ensuring that the trunk is not overutilized. However, bandwidth reservation on a trunk means that only a limited number of paths can pass through the trunk. Where a trunk has reached its bandwidth capacity through bandwidth reservations, connection paths will have to be established on different trunks. This can lead to the establishment of less efficient paths. In some networks, if enough bandwidth is not available on a trunk, bumping of traffic may have to be done to accommodate higher priority traffic. This could lead to loss of traffic and utilization of less efficient paths.

Applications are available in connection-oriented packet switching networks that require alterations to be made to the connection paths. These alterations can include changes being done to the characteristics of the path, which may include the route traversed by the path. For example, path optimization is an application where a path established along a particular route is moved to a more optimal or more efficient route. Bumping is an application where a connection path is moved to a different route to accommodate another connection whose traffic is of higher priority. Path attribute adjustment is an application where attributes of a path such as bandwidth requirement or quality of service can be altered. Though only path bandwidth requirement adjustment will be illustrated in further detail, the concepts and methods described in this document are applicable to adjusting any attribute of the connection path.

To minimize traffic loss and interruption to the traffic, all of the above applications require the establishment of an alternate path while the active path carries data. Traffic is then switched from the active path to the alternate path thus making the alternate path active and the formerly active path redundant. This redundant path is then torn down leaving only one connection path. One of the difficulties with the implementation of the aforementioned applications relates to the fact that bandwidth for the alternate path must be reserved on all trunks along its route, while at the same time the active path continues to maintain its bandwidth reservations along its route until it is torn down. This double-reservation of bandwidth is an unnecessary waste of network resources and may limit the success rate of the aforementioned applications.

SUMMARY OF THE INVENTION

According to the present invention, there is provided a connection-oriented packet switching network including a plurality of switching nodes interconnected by transmission links, and in which data packets are transmitted on an active path between a source node and a destination node wherein bandwidth is allocated by means of a bandwidth reservation on all transmission links between said source node and said destination node for said active path, said connection-oriented packet switching network comprising: means for allocating switching network comprising: means for allocating bandwidth to an alternate path between said source node and said destination node such that on all transmission links common to both said active path and said alternate path the bandwidth allocation for said active path is shared with said alternate path without a double reservation of bandwidth for said alternate path; and means for transferring said shared bandwidth allocation from said active path to said alternate path.

The present invention is used in association with connection-oriented packet switching networks where there is an existing active path currently carrying data, but where there is a desire to establish an alternate path with the intention of switching the data from the active path to the alternate path, and eventually tearing down the formerly active path. This invention can be used to establish an alternate path that has one or more of a number of different attributes that vary from the attributes of the active path. For example, an alternate path may be established that traverses from the source node to the destination node along a different route than the route traversed by the active path, such route possibly, but not necessarily, being a more optimal route. Alternatively, the alternate path may traverse the same route as the active path, but have bandwidth requirements that vary from the bandwidth requirements of the active path. Alternatively, the alternate path may traverse along a different route than the route traversed by the active path, and have bandwidth requirements that vary from the bandwidth requirements of the active path. The above examples are not meant to narrow the scope of the present invention, but merely to illustrate some of the applications for the present invention.

The present invention relates to a means for establishing an alternate path which is capable of sharing bandwidth reservation with an existing active path on trunks through which both paths pass. This sharing of bandwidth reservation is referred to hereinafter as "correlation", ie. a means for enabling two distinct paths to share bandwidth reservation on trunks through which they both pass. Correlation of paths means that a greater number of paths can now pass through trunks than before, maximizing the chances of establishing an alternate path with the desired characteristics.

Once an alternate path is correlated to an active path, the alternate path is switched in real time (hereinafter referred to as "hot-swapped") for the active path and the previously active path is torn down. Hot-swapping means that all the traffic is transferred from the active path to the alternate path thus making the alternate path active.

At all times only one path carries traffic which means that on trunks through which both paths pass, the active path and the alternate path can share the same bandwidth reservation. Since the active path already has bandwidth reserved for its traffic on the trunk, when the alternate path establishes on the same trunk it can correlate itself to the active path, thereby sharing the bandwidth reservation with the active path. That is, the alternate path reserves only as much bandwidth as is necessary on that trunk. For example, consider an active path that has reserved 50 bits/s of bandwidth on every trunk through which it passes, and where the bandwidth requirements change so that it is desired that an alternate path be established that requires 150 bits/s of bandwidth. In this case, the alternate path would only have to reserve 100 bits/s of bandwidth on trunks through which both paths pass. In a case where it is desired that the alternate path traverse a more optimal route than the active path, but where the bandwidth requirements for the alternate path are equal to the bandwidth requirements for the active path, the alternate path would reserve 0 bits/s of bandwidth on trunks through which both paths pass. On trunks where the alternate path cannot correlate to an active path, the alternate path will reserve the required amount of bandwidth for its traffic.

Path optimization is an application for the present invention that involves the establishment of an alternate path that traverses a route from the source node to the destination node that is more optimal, as compared to the route traversed by the active path. If such an alternate path is successfully established, data is hot-swapped from the active path to the alternate path, thus making the alternate path active, and the formerly active path redundant. The redundant path is then torn down. On trunks through which the active path and alternate path both pass, the alternate path correlates itself to the active path thereby sharing bandwidth reservation with the active path. This sharing of bandwidth reservation improves the alternate path's chances of being established, as shown by the following example. Assume a trunk has a capacity of 900 bits/s and there are four paths passing through it, each reserving 200 bits/s of the trunk's bandwidth. An alternate path cannot be established for any of the four active paths over this trunk since 200 bits/s of bandwidth would be needed, and the trunk only has 100 bits/s free. Therefore, in highly utilized networks without bandwidth correlation, many alternate paths would fail to be established due to a lack of free trunk bandwidth resulting in failed path optimizations.

Path bandwidth requirement adjustment is an application where an attempt is made to change the active path's bandwidth requirement. For example, assume a connection is using the active path to send 50 bits/s of data. The active path has therefore reserved 50 bits/s of bandwidth on every trunk through which it passes. Assume that now this connection's bandwidth requirement changes so that it is desired that this connection accommodate 150 bits/s of data. To accomplish this change, an alternate path can be established parallel to the active path. As was the case for path optimization, if this alternate path is successfully established then the data is hot-swapped from the active path to the alternate path thus making the alternate path active and the formerly active path redundant. The redundant path is then torn down. Since the alternate path traverses all the same trunks as the active path, it can correlate itself to the active path, thereby sharing bandwidth reservations with the active path. This sharing of bandwidth reservations improves the alternate path's chances of being established. As in the case for path optimizations described above, in highly utilized networks without bandwidth correlation, many alternate paths would fail to be established due to a lack of free trunk bandwidth resulting in failed path bandwidth requirement adjustments.

In both of the applications described above, it is important to note that at any time only one path carries data. This means that on trunks through which both paths pass, both the active path and the alternate path can share bandwidth reservation without compromising the operation of the trunks. That is, without overutilizing the trunks. Since the active path already has bandwidth reserved for its traffic on a trunk, when the alternate path establishes on the same trunk, it correlates itself to the active path and shares the bandwidth reservation with the active path. The alternate path either reserves no additional bandwidth on that trunk when its bandwidth requirement is the same or lower than that of the active path, or the alternate path reserves the amount of bandwidth requirement that is above the bandwidth requirement of the active path. For example, assume an active path has 50 bits/s reserved on a trunk. If an alternate path establishes over this trunk as part of path optimization then it reserves 0 bits/s on the trunk. If an alternate path establishes over this trunk as part of path bandwidth requirement adjustment from 50 bits/s to 150 bits/s then it reserves 100 bits/s on the trunk. If an alternate path establishes over this trunk as part of path bandwidth requirement adjustment from 50 bits/s to 10 bits/s then it reserves 0 bits/s on the trunk.

The means for establishing alternate paths with bandwidth correlation in a connection-oriented network comprises three stages: (1) Keying stage; (2) Correlation stage; and, (3) Transfer stage.

During the keying stage a unique key is used to key segments of the active path on each trunk through which the active path passes.

This key is a unique combination of bits that is used during the correlation stage to correlate an alternate path to the active path on trunks through which both paths pass. This correlation permits the alternate path to share bandwidth reservation with the active path on trunks where they both share traffic. On trunks where the paths do not share data, the alternate path cannot correlate to the active path since the active path does not pass through that trunk. On these trunks, the alternate path reserves the required amount of bandwidth to maintain the connection.

The transfer stage follows the successful establishment of the alternate path and the successful hot-swapping of the alternate path for the active path thus making the alternate path active and the formerly active path redundant. During the transfer stage the teardown of the formerly active path occurs simultaneously with the transfer of bandwidth reservations from the previously active path to the newly active path on trunks where both paths were correlated.

DETAILED DESCRIPTION OF THE PREFERRED EMBODIMENT

Figure 1:
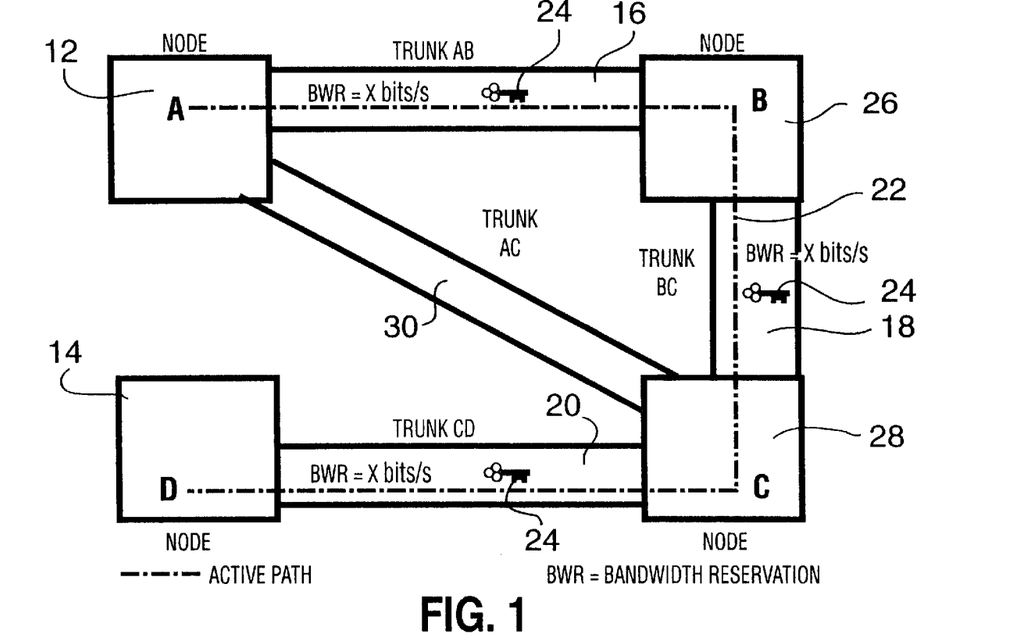
FIG. 1 is a block diagram of a set of nodes ABCD in a connection-oriented network after the keying stage of the method of the present invention.

In a connection-oriented network such as the one illustrated in FIG. 1, a connection is established from a source node A 12 to a destination node D 14 by reserving bandwidth on all transmission trunks AB 16, BC 18, and CD 20. This connection is known to persons skilled in the art as a virtual circuit, or temporary virtual path, it being released at the end of the communication. The path ABCD will be referred to herein as the active path. The active path ABCD is symbolically represented by a line 22 and the bandwidth reservation (BWR) of X bits/s ensures that there will always be enough bandwidth along each transmission trunk to send data along the active path.

The means for establishing alternate paths with bandwidth correlation in a connection-oriented network comprises three stages: (1) Keying stage; (2) Correlation stage; and (3) Transfer stage.

During the keying stage, a keying packet (not illustrated) containing a unique combination of bits (hereinafter referred to as a key 24) is transmitted through the active path ABCD. This unique key 24, in association with the logical channel number of a segment of the active path, is stored at each of the nodes A 12, B 26, C 28 and D 14. As will be described in more detail below, this unique key 24 will be used to correlate the bandwidth reservation of a segment of an alternate path to the segment of the active path on a trunk through which both paths pass.

Figure 2:
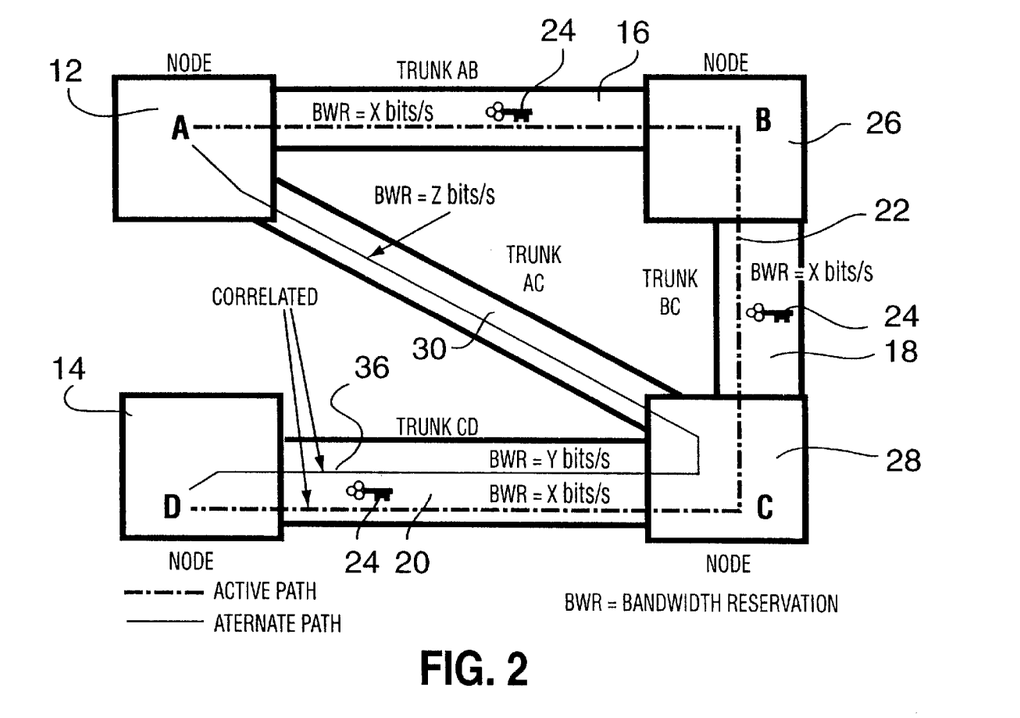
FIG. 2 is a block diagram of the same set of nodes ABCD after the correlation stage of the method of the present invention.

In FIG. 2 there is shown the same connection-oriented network after the correlation stage, where an alternate path is selected to pass through the trunks AC 30 and CD 20. It should be emphasized that the actual selection of the alternate path ACD by network management resources forms no part of this invention. The alternate path ACD is symbolically represented by a line 36 and it has a bandwidth requirement of Z bits/s.

Since the active path does not pass through the trunk AC 30, there is no bandwidth correlation on this segment of the alternate path. Thus, on trunk AC 30, the alternate path reserves the required amount of bandwidth of Z bits/s to maintain the connection. However, for the trunk segment CD 20 on the alternate path ACD, there is already a bandwidth reservation of X bits/s for the active path ABCD passing through trunk CD 20. The alternate path passing through trunk CD 20 will therefore have to reserve Y bits/s of bandwidth on this trunk where:

(i) Y=0 if the bandwidth requirement of the alternate path is the same or lower than the bandwidth requirement of the active path passing through trunk CD 20. This case would apply to path optimizations where the bandwidth requirements of the alternate path and the active path are the same, and to path bandwidth requirement adjustment where the bandwidth requirements of the active path are to be decreased; and (ii) Y=Z−X, where the bandwidth requirement of the alternate path is greater than the bandwidth requirement of the active path. This case would apply for path bandwidth requirement adjustment where the bandwidth requirements of the active path are to be increased.

Without bandwidth correlation, the alternate path ACD would have to reserve as much bandwidth as required along trunk CD 20. That is, it would have to reserve exactly Z bits/s on trunk CD 20. This would be an unnecessary waste of network resources since only the active path carries data.

In accordance with the present invention, the bandwidth reservation for the segment CD 20 of the alternate path ACD is correlated to the bandwidth reservation of this segment of the active path ABCD by the use of the unique key 24 stored at each node in association with the logical channel number of that segment of the active path. Thus, the bandwidth reservation of this segment of the alternate path ACD is reserved at a rate of Y bits/s, where Y=0 or Y=Z−X, depending on the desired characteristics and purpose of the alternate path, as set out above. This is sufficient because no data passes through this segment of the alternate path ACD until data passing through the active path ABCD is switched to the alternate path ACD.

Figure 3:
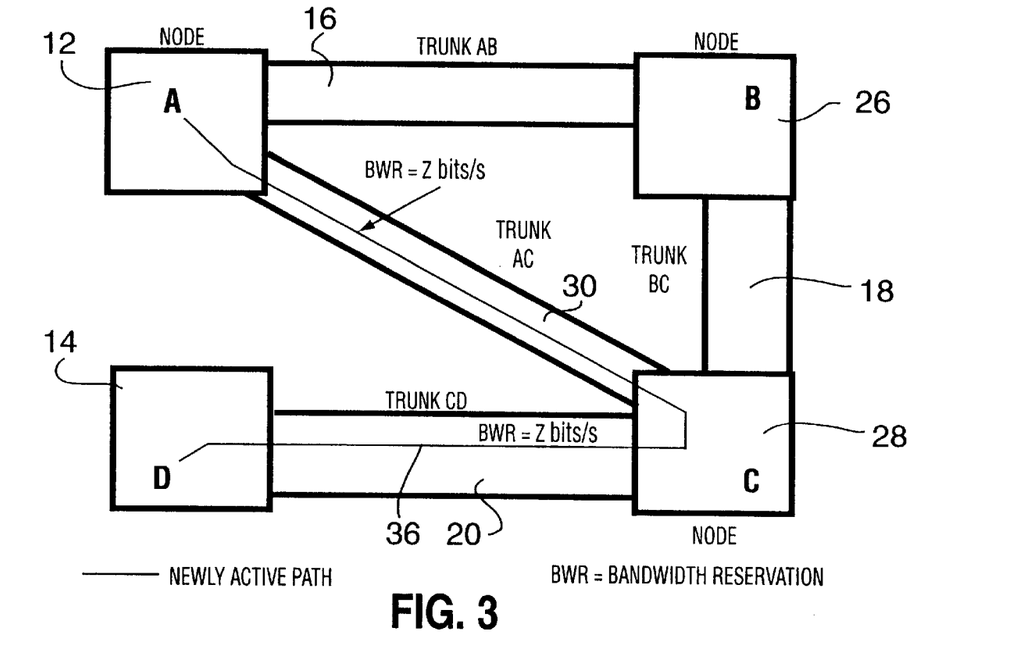
FIG. 3 is a block diagram of the same set of nodes ABCD after the transfer stage of the method of the present invention.

In FIG. 3 there is shown the same connection-oriented network after the transfer stage takes place between the active path ABCD and the alternate path ACD. The transfer stage follows a successful establishment of the alternate path ACD, and a successful hot-swapping of the data traffic from the active path ABCD to the alternate path ACD, thereby making the alternate path ACD active, and the formerly active path ABCD redundant. During the transfer stage the teardown of the previously active path ABCD causes the bandwidth reservation or a portion thereof, from the previously active path ABCD to be transferred to the newly active path ACD on trunk CD 20. This is illustrated in FIG. 3 where the newly active path ACD has received the previously active path's bandwidth reservation for the segment of the path along trunk CD 20. There are two cases to consider:

(i) when the bandwidth requirement of the newly active path of Z bits/s is greater than or equal to the bandwidth reservation of the formerly active path of X bits/s, the newly active path receives the entirety of the formerly active path's bandwidth reservation of X bits/s on trunk CD 20. Since the alternate path already had Y bits/s of bandwidth reserved on trunk CD 20, it now has Z bits/s reserved on that trunk, where Z=X+Y, and (ii) when the bandwidth requirement of the newly active path of Z bits/s is less than the bandwidth reservation of the formerly active path of X bits/s, the newly active path receives only a portion of the formerly active path's bandwidth reservation. This portion equals the newly active path's bandwidth requirement of Z bits/s.

What follows is a more detailed description of the general description above of the three stages for establishing alternate paths with bandwidth correlation in a connection-oriented network. The mechanism for the establishment of an alternate path with bandwidth correlation in a connection-oriented network is based on the mechanism for the establishment of an active path in such networks. The first step in this mechanism is the transmission of an active path setup packet throughout the network.

Figure 4:
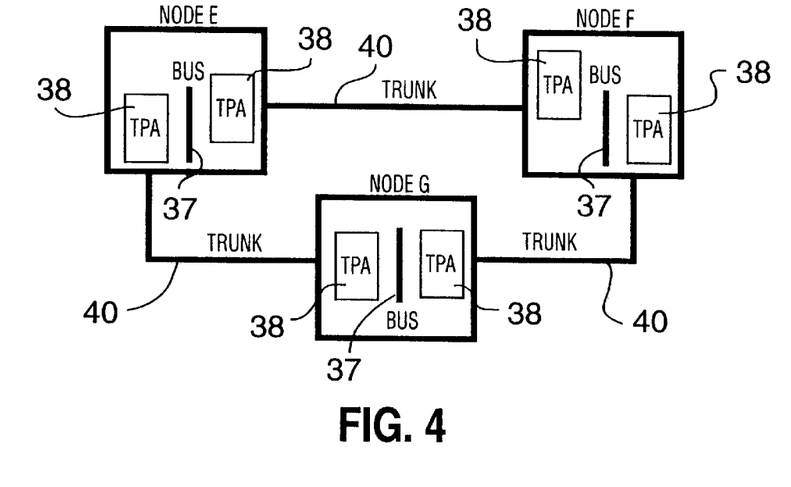
FIG. 4 is a block diagram of a set of nodes EFG in a connection-oriented network illustrating the Trunk Path Administrators (TPAs) used in the present invention.

FIG. 4 illustrates Trunk Path Administrators (TPAs) 38, which are responsible for establishing and managing paths along each trunk 40, and can be responsible for forwarding packets along the paths. A TPA 38 is a software entity that resides on each end of every trunk 40 between nodes E, F and G. Each TPA 38 contains a software implemented forwarding and correlation table which will be described in greater detail hereinafter. The TPAs 38 within a particular node are interconnected by means of a bus 37.

When a TPA 38 receives an active path setup packet it establishes the active path by (1) allocating a Logical Channel (LC) on its trunk 40 along which packets will travel, and, (2) reserving the required amount of bandwidth to be used by the LC. The TPA 38 identifies each LC by a unique Logical Channel Number (LCN). In any connection-oriented service, all packets belonging to the same connection travel on the same LC of a trunk 40. They may, however, travel along different LC's on different trunks 40. Bandwidth reservation is the means of ensuring that there will be enough free bandwidth on a TPA's trunk 40 to send packets along the LC. To keep track of the LC allocations and their bandwidth reservations, each TPA 38 maintains a forwarding table 41 with the structure illustrated in FIG. 5. A path can be considered to be a sequence of logical channels from source to destination.

Figure 5:
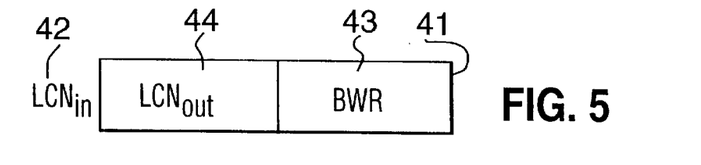
FIG. 5 is a block diagram of a TPA forwarding table used in the present invention.

In FIG. 5, $LCN_{in}$ 42 is the LCN of the LC allocated by the TPA 38, and $LCN_{out}$ 44 is the LCN of the LC allocated by the next TPA 38 in the chain which is across the bus 37. When the TPA 38 receives a data packet on LC $LCN_{in}$ 42 of its trunk 40 it will forward the packet to the next TPA 38 in the chain to be forwarded by that TPA 38 on LC $LCN_{out}$ 44. Each $LCN_{in}$ 42 has a bandwidth reservation (BWR 43) that is stored in the forwarding table 41.

Figure 6:
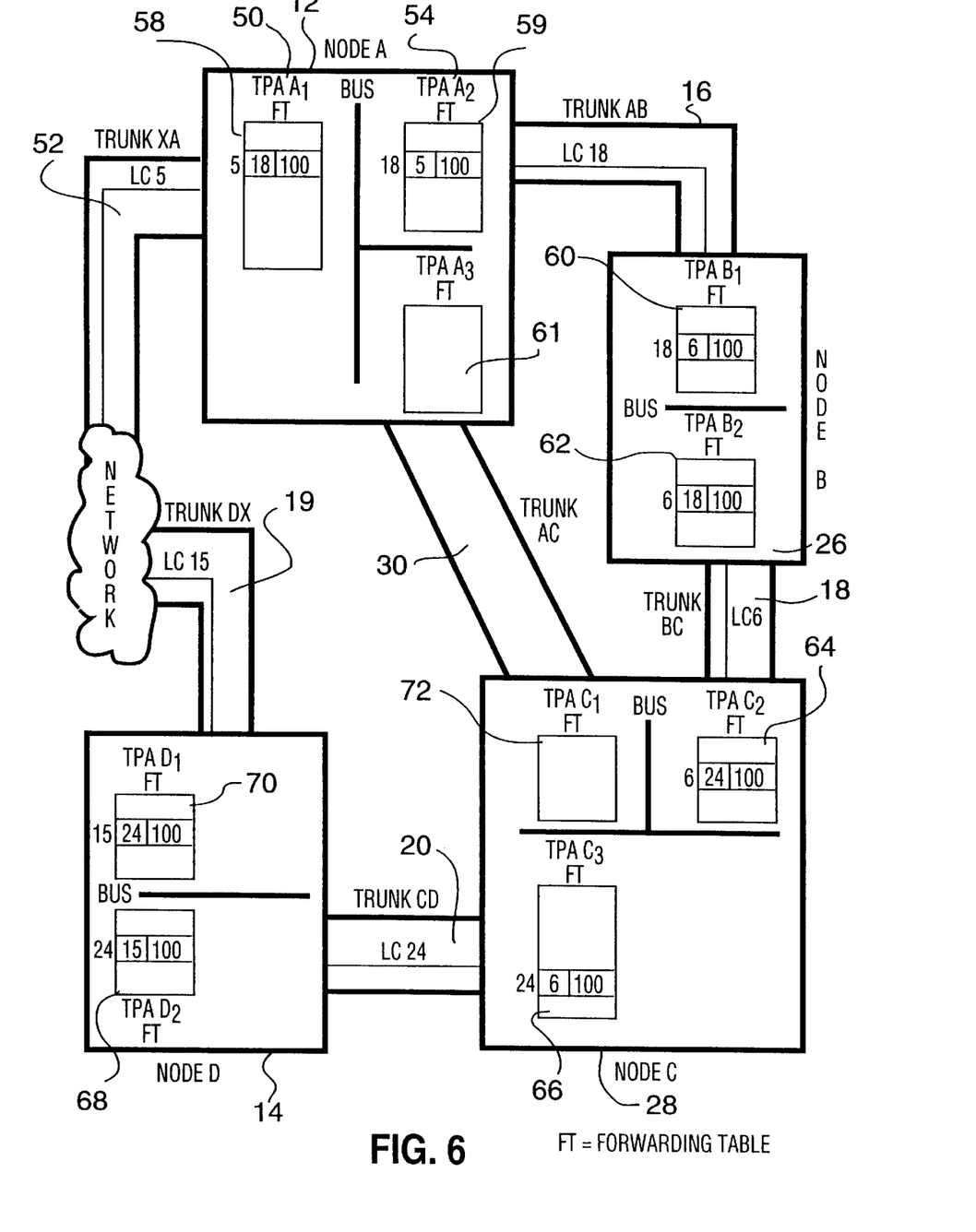
FIG. 6 is a block diagram of the set of nodes ABCD during the active path establishment protocol.

The protocol for the establishment of an active path is illustrated in detail in FIG. 6. In this connection-oriented network, a 100 bits/s path is to be established from node A 12 to node B 26 to node C 28, to node D 14, where the LCs allocated for this active path ABCD are going to be 5, 18, 6, 24 and 15 on trunks XA 52, AB 16, BC 18, CD 20 and DX 19 respectively.

At node A 12, an active path setup packet (not illustrated) arriving at TPA $A_1$ 50 over trunk XA 52 indicates that all packets on this path will travel on LC 5, and that bandwidth requirement of this path is 100 bits/s. On its trunk XA 52 TPA $A_1$ 50 allocates LC 5 for this path and reserves 100 bits/s of bandwidth for the path. TPA $A_1$ 50 then forwards the setup packet to TPA $A_2$ 54, which on its trunk AB 16 allocates LC 18 for the path and reserves 100 bits/s of bandwidth for the path. TPA $A_2$ 54 then returns LCN=18 back to TPA $A_1$ 50 which indicates to TPA $A_1$ 50 that all packets which arrive over trunk XA 52 on LC 5 should be directed to TPA $A_2$ 54 with header containing LCN=18 to be forwarded over LC 18 on trunk AB 16. As shown in FIG. 6, LCN=18 is stored in row 5 of the forwarding table 58 contained within TPA $A_1$ 50. All TPAs in FIG. 6 contain correlation tables as well as forwarding tables but the correlation tables are omitted from FIG. 6 for clarity. Since packets can travel in both directions, TPA $A_2$ 54 must know where and how to direct packets arriving over trunk AB 16 on LC 18. This information is obtained from the setup packet received by TPA $A_2$ 54 from TPA $A_1$ 50. In this example, all packets received by TPA $A_2$ 54 on LC 18 of trunk AB 16 should be directed to TPA $A_1$ 50 with header containing LCN=5 to be forwarded over LC 5 on trunk XA 52. LCN=5 is thus stored in row 18 of the forwarding table 59 contained within TPA $A_2$ 54. The setup packet is then forwarded over trunk AB 16 to arrive at node B 26.

The establishment of the active path at nodes B 26, C 28, and D 14 follows the same pattern as that described above. After a complete establishment of the active path ABCD at nodes A 12, B 26, C 28, and D 14, the TPA forwarding tables 58 59 60 61 62 64 66 68 70 and 72 are as illustrated in FIG. 6.

The same setup protocol described above could be used to set up an alternate path that passes, for example, through only node A 12, node C 28, and node D 14. However, the use of this setup protocol may result in the alternate path failing to be established because bandwidth requirements for some of the segments of the alternate path cannot be met by the TPAs. Referring back to FIG. 4, assume a trunk 40 can carry 900 bits/s and there are four active paths already allocated on it, each reserving 200 bits/s of bandwidth. An alternate path cannot be established for any of the four active paths over this trunk 40, since this trunk's TPAs 38 would need to reserve 200 bits/s, and the trunk 40 only has 100 bits/s free. The use of the active path setup protocol described above would mean that in highly utilized networks alternate paths would frequently fail to be established due to a lack of available bandwidth on trunks. Depending on the desired application for the alternate path, this would lead to failed path optimizations, or failed path bandwidth requirement adjustments.

The selection of the alternate path for the purpose of path optimization or path bandwidth requirement adjustment is conducted by network management resources that do not form part of this invention. However, once the alternate path is selected, this invention establishes the alternate path by correlating the bandwidth reservation of the alternate path to the bandwidth reservation of an active path on any trunk segment through which both paths pass. After correlation and successful establishment of the alternate path, a hot-swapping of data takes place from the active path to the alternate path, followed by a tearing down of the formerly active path and simultaneous transfer of bandwidth reservations from the active path to the alternate path on trunk segments where both paths were correlated.

Figure 7:
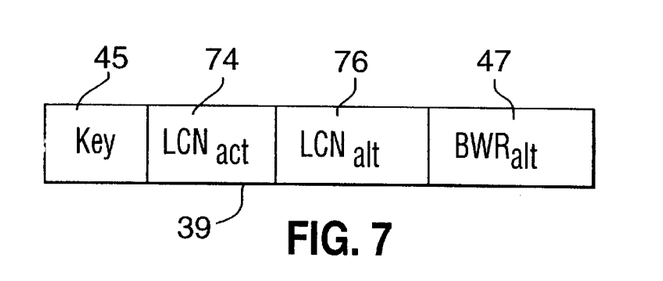
FIG. 7 is a block diagram of a TPA correlation table used in the present invention.

In order for there to be a correlation between a segment of an active path with a segment of an alternate path, each TPA 38 maintains a correlation table 39 which has the structure illustrated in FIG. 7, where Key 45 is a unique combination of bits that will be used to correlate an alternate path to an active path, $LCN_{act}$ 74 is the LCN of the active path, $LCN_{alt}$ 76 is the LCN of the alternate path, and $BWR_{alt}$ 47 is the bandwidth requirement of the alternate path. When no alternate path is correlated to an active path then $LCN_{alt}$ 76 has a value of NONE. When the bandwidth requirement of an alternate path is unknown then $BWR_{alt}$ 47 has a value of NONE.

What follows is a detailed description of the three stages for establishing alternate paths with bandwidth correlation in a connection-oriented network. These stages include the keying stage, the correlation stage, and the transfer stage. Each stage is described by assuming that the state of the network is as illustrated in FIG. 6. That is, an active path is established from node A 12 to B 26 to C 28 to D 14 with allocated LCs of 5, 18, 6, 24 and 15 on trunks XA 52, AB 16, BC 18, CD 20 and DX 19 respectively, and with reserved bandwidth of 100 bits/s. Also, assume an alternate path is to be established from node A 12 to C 28 to D 14 and LCs allocated for this path are going to be 7, 12, 16 and 3 on trunks XA 52, AC 30, CD 20 and DX 19 respectively, and the bandwidth requirement of the alternate path is going to be 150 bits/s. Note that this example will illustrate path optimization as well as path bandwidth requirement adjustment. Path optimization will be illustrated because over this network the alternate path is more optimal (better) than the active path if the measure of optimality is the number of hops that a path uses. Path bandwidth requirement adjustment will be illustrated because the alternate path's bandwidth requirement of 150 bits/s is greater than the active path's bandwidth requirement of 100 bits/s. Throughout this example assume X bits/s is the active path's bandwidth requirement, and Z bits/s is the alternate path's bandwidth requirement.

Figure 8:
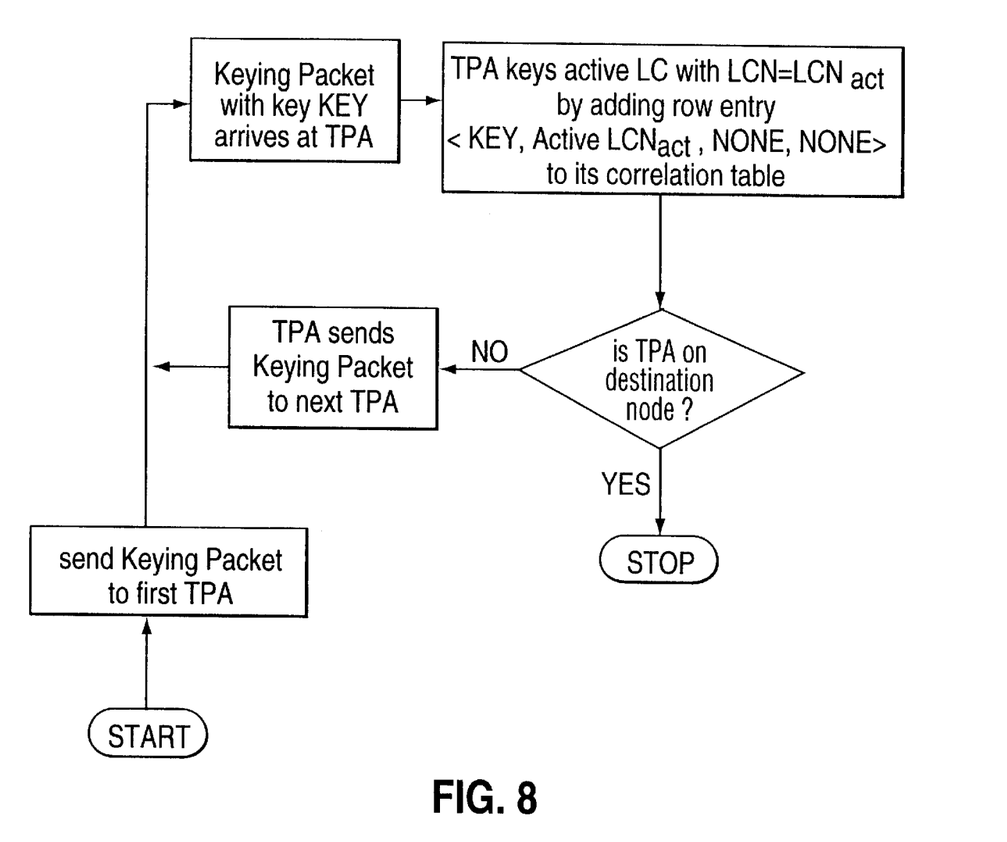
FIG. 8 is a flowchart of the keying stage of the present invention.

During the keying stage, a keying packet containing a unique combination of bits as a key is sent along the active path from the source node to the destination node. Referring to FIG. 4 and FIG. 7, this unique key is used by each TPA 38 to key the active LC on which the packet travels. The TPA 38 keys this active LC by adding a new row entry to its correlation table 39. A tuple notation of <KEY, $LCN_{act}$, $LCN_{alt}$, $BWR_{alt}$> will be adopted as a representation of this row entry. FIG. 8 is a flowchart of the keying stage of the present invention.

Figure 9:
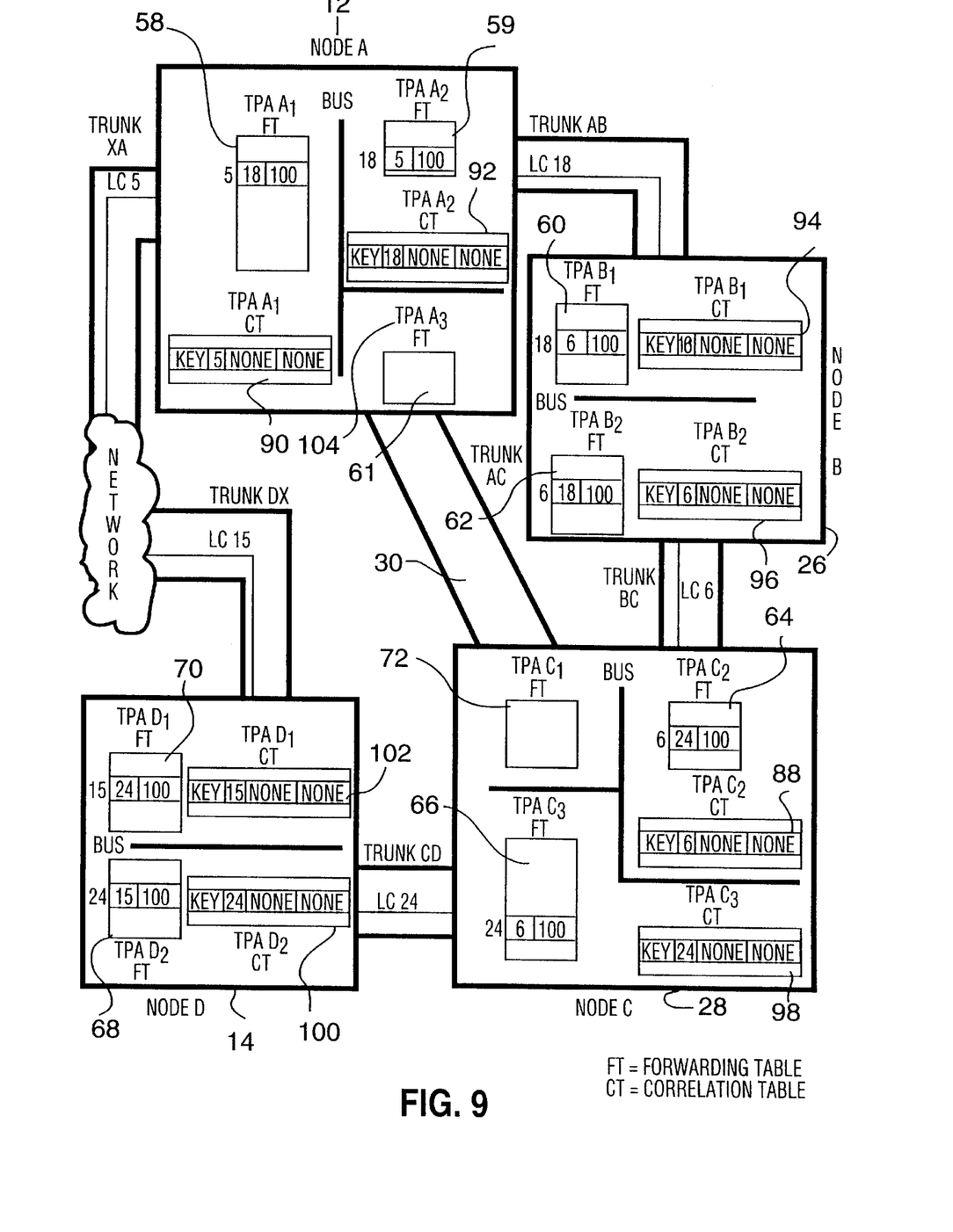
FIG. 9 is a block diagram of the set of nodes ABCD after the keying stage but illustrating more detail than FIG. 1.

Referring to FIG. 9, LC 5 and LC 18 are keyed on node A 12, LC 18 and LC 6 are keyed on node B 26, LC 6 and LC 24 are keyed on node C 28, and LC 24 and LC 15 are keyed on node D 14. This results in row entries being added to the correlation tables. Since at this stage no correlation has been performed, the $LCN_{alt}$ values stored in the correlation tables 88 90 92 94 96 98 100 and 102 are all equal to NONE. As well, the bandwidth requirement of the alternate path at this stage is unknown, so the $BWR_{alt}$ values stored in these correlation tables are also all equal to NONE. Thus, using the tuple notation for row entries, row entry <KEY, 5, NONE, NONE> and <KEY, 18, NONE, NONE> are stored in the correlation tables 90 and 92, row entry <KEY, 18, NONE, NONE> and <KEY, 6, NONE, NONE> are stored in the correlation tables 94 and 96, row entry <KEY, 6, NONE, NONE> and <KEY, 24, NONE, NONE> are stored in the correlation tables 88 and 98, and row entry <KEY, 24, NONE, NONE> and <KEY, 15, NONE, NONE> are stored in the correlation tables 100 and 102. After the keying stage is completed, the TPA forwarding tables 58 59 60 61 62 64 66 68 70 and 72 and correlation tables 88 90 92 94 96 98 100 and 102 are as illustrated in FIG. 9.

The keying stage is followed by the correlation stage during which an alternate path setup packet is sent through the network to establish the alternate path. This setup packet carries the same unique key which was used to key LCs along the active path during the keying stage described above. Referring to FIGS. 4 and 7, the TPA 38 handles the alternate path setup packet in the same way as an active path setup packet with the following exception. After it allocates an alternate LC with LCN=$LCN_{alt}$ 76 for the alternate path, the TPA 38 uses the key to search its correlation table 39 to determine whether there is a currently active LC with LCN=$LCN_{act}$ 74 associated with that same key. If no active LC is associated with that same key, then TPA 38 establishes the alternate path on its trunk using the same protocol as that described above for the active path establishment. That is, the required amount of bandwidth is reserved on the trunk and the alternate path setup packet is forwarded to the next TPA 38.

If the TPA 38 locates a matching key in the correlation table 39 stored in association with $LCN_{act}$ 74 of active LC, then $LCN_{alt}$ 76 of alternate LC is stored in the same row in the correlation table 39 as the $LCN_{act}$ 74 and, depending on the desired application for the alternate path, either Y=0 bits/s or Y=(Z–X) bits/s of bandwidth is reserved for the alternate LC. As explained with reference to FIG. 2, Y=0 bits/s of bandwidth is reserved for the alternate LC when the desired bandwidth of the alternate path of Z bits/s is less than or equal to the bandwidth requirement of the active path of X bits/s, and Y=(Z–X) bits/s of bandwidth is reserved for the alternate LC when the desired bandwidth of the alternate path of Z bits/s is greater than the bandwidth requirement of the active path of X bits/s.

Figure 10:
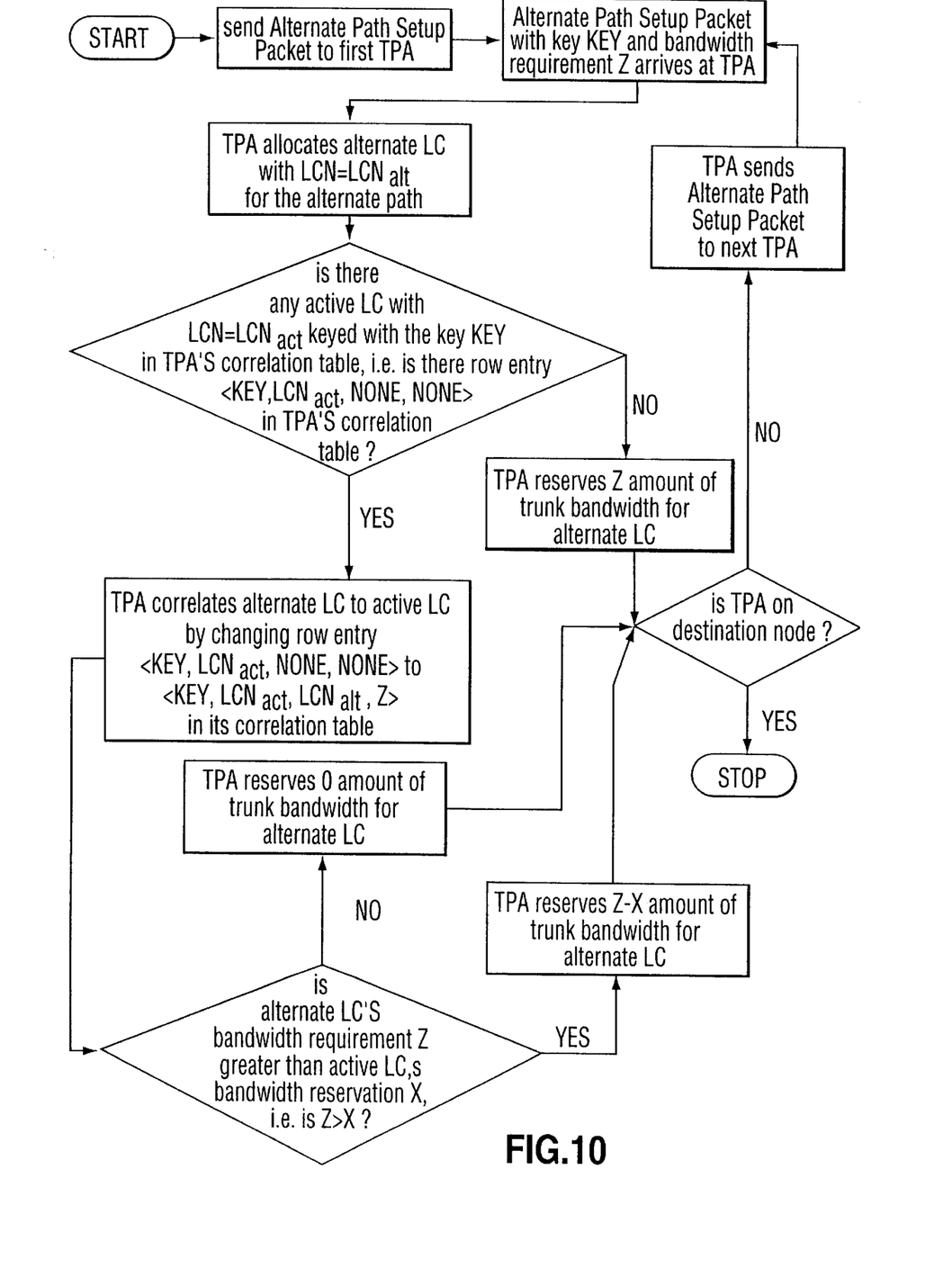
FIG. 10 is a flowchart of the correlation stage of the present invention.

This procedure is known as correlation because there is an association made between the active LC and the alternate LC. The TPA 38 correlates an alternate LC to its active LC by changing the row entry <KEY, $LCN_{act}$, NONE, NONE> to <KEY, $LCN_{act}$, $LCN_{alt}$, Z> in the correlation table 39 maintained by that TPA 38. When the alternate LC is correlated to the active LC, a bandwidth of Y bits/s is reserved for the alternate LC on the trunk. The alternate setup packet is then forwarded to the next TPA 38 where the correlation stage is repeated. FIG. 10 is a flowchart of the correlation stage of the present invention.

Figure 11:
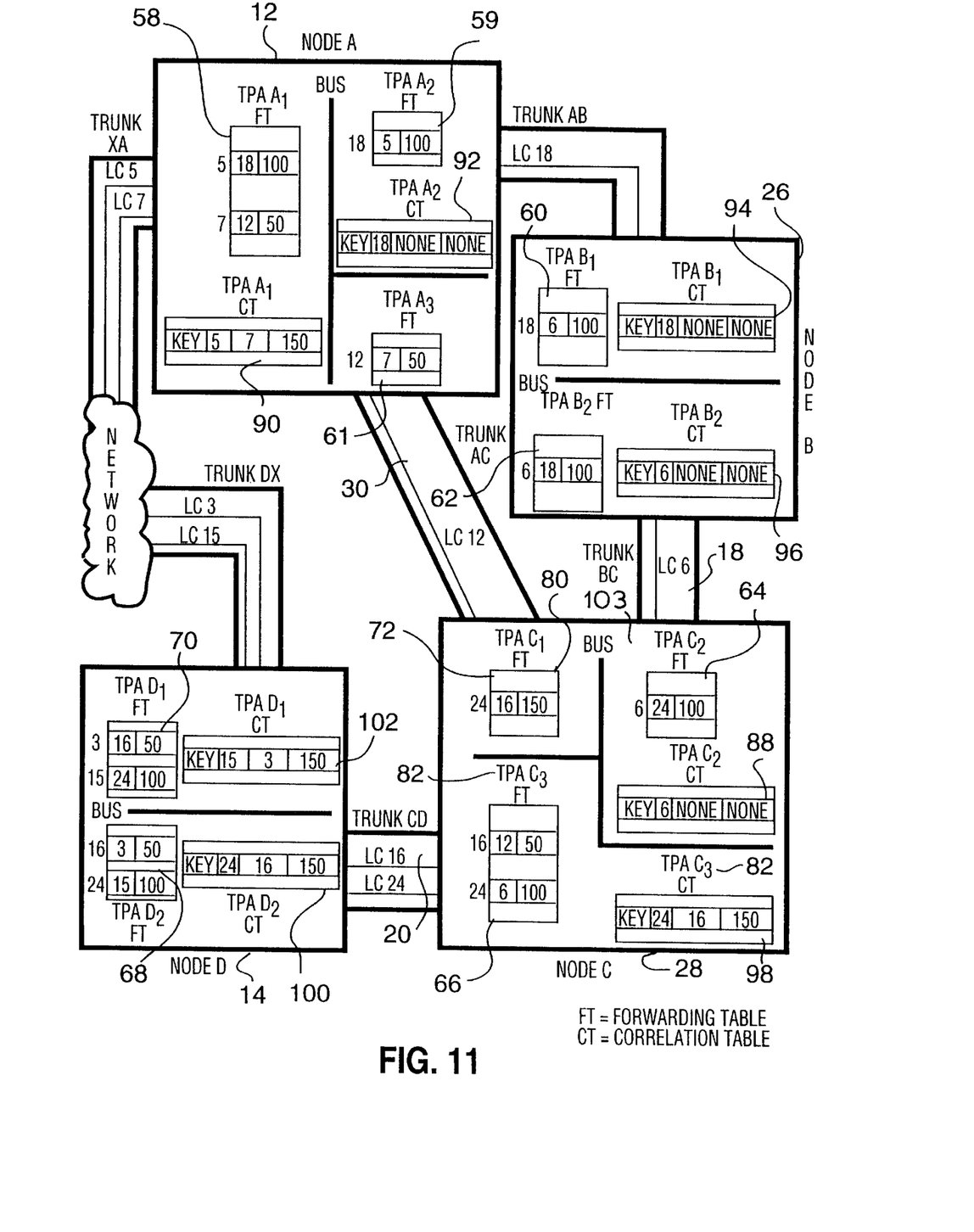
FIG. 11 is a block diagram of the set of nodes ABCD after the correlation stage but illustrating more detail than FIG. 2.

Referring to FIG. 11, the alternate path setup packet (not shown) is received by TPA $C_1$ 80 on node C 28. This packet indicates that all packets on this path will travel on LC 12, and that the bandwidth requirement of this path is 150 bits/s. TPA $C_1$ 80 thus allocates LC 12 for the alternate path. TPA $C_1$ 80 then uses the key contained in the setup packet to search its correlation table to find whether there is an LC keyed with the same key. There is none, so TPA $C_1$ 80 reserves 150 bits/s of bandwidth for the alternate path on trunk AC 30, and the setup packet is forwarded to TPA $C_3$ 82 which allocates LC 16 for the alternate path. It then transmits LCN=16 back to TPA $C_1$ 80 which stores LCN=16 in row 12 of its forwarding table 72. TPA $C_3$ 82 then uses the key from the setup packet to search its correlation table 98 to find whether there is an LC keyed with the same key. In this case, LC 24 is found to be associated with this same unique key. As a result, TPA $C_3$ 82 correlates LC 16 to LC 24 by changing the row entry <KEY, 24, NONE, NONE> to <KEY, 24, 16, 150> in its correlation table 98. Since X=100 bits/s of bandwidth has already been reserved for this segment of the active path on LC 24, and Z=150 bits/s, then Z>X and thus in accordance with the scheme set out above for cases when Z>X, Y=(Z–X) bits/s, or in this case 50 bits/s of bandwidth is reserved for this segment of the alternate path on LC 16. The alternate path setup packet is then forwarded over trunk CD 20 to arrive at node D 14. The process of establishing the alternate path at nodes A 12 and nodes D 14 follows the same pattern. After the correlation stage is complete, the TPA forwarding tables 58 59 60 61 62 64 66 68 70 and 72 and correlation tables 88 90 92 94 96 98 100 and 102 are as illustrated in FIG. 11.

Upon completion of the correlation stage at all the nodes along the alternate path, the alternate path is hot-swapped for the active path, thus making the alternate path active, and the formerly active path redundant. It should be emphasized that the hot-swapping of the alternate path for the active path forms no part of this invention.

Figure 12:
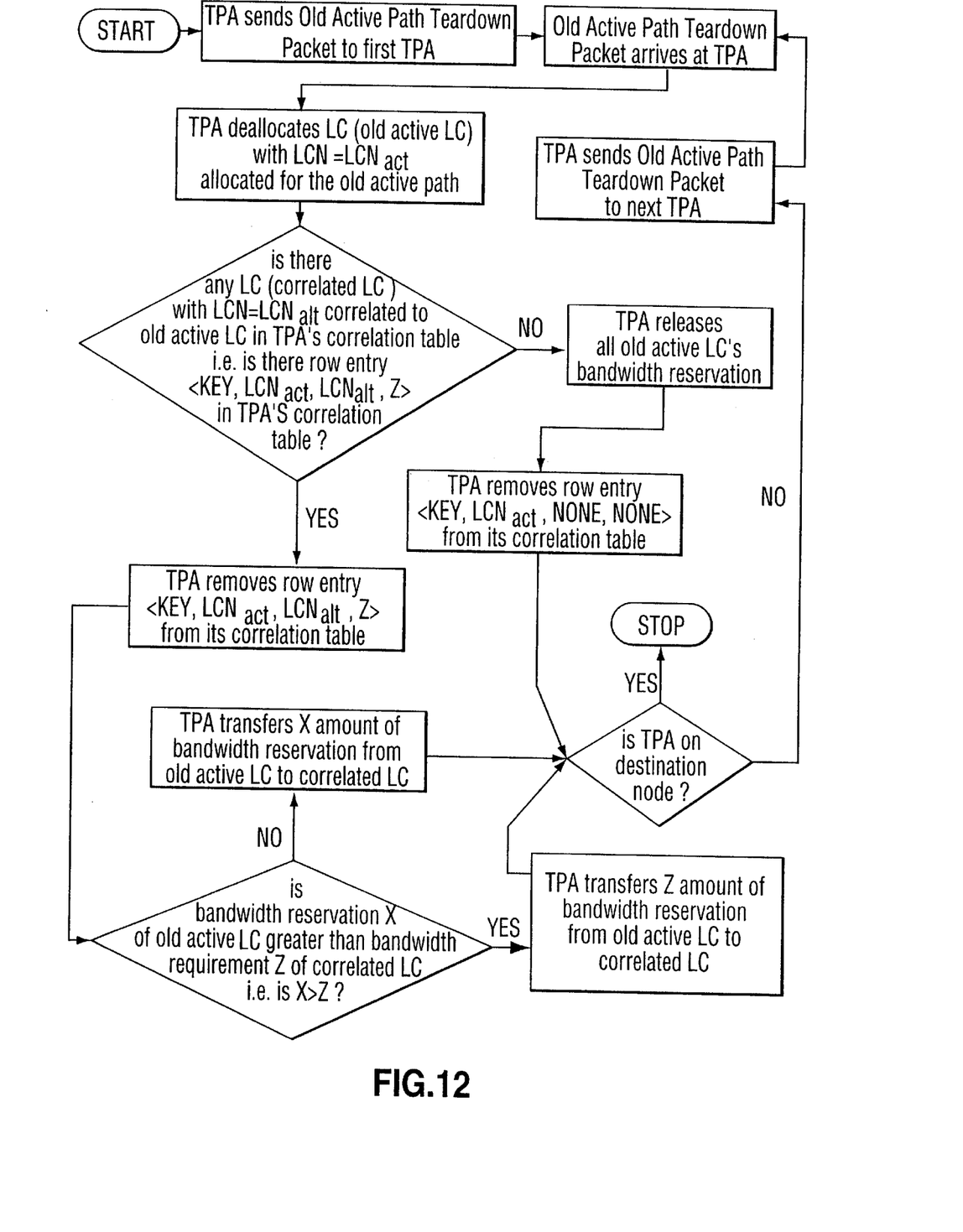
FIG. 12 is a flowchart of the transfer stage of the present invention.

The transfer stage follows the hot-swapping of the alternate path for the active path. After hot-swapping, all data being transmitted from source to destination now travels on the newly active path. The formerly active path is torn down by sending a teardown packet along this path. Referring to FIGS. 4 and 7, when the TPA 38 receives a teardown packet it deallocates the LC (hereinafter referred to as the "old active LC") with LCN=LCN$_{act}$ 74 on which this packet travelled and then searches its correlation table 39 to determine whether there is some LC (hereinafter referred to as the "correlated LC") with LCN=LCN$_{alt}$ 76 correlated to the old active LC. If no LC is found to be correlated to the old active LC, the bandwidth reserved by the old active LC is released and the row entry <KEY, LCN$_{act}$, NONE, NONE> is deleted from that TPA's correlation table 39. If the TPA 38 finds some LC (the correlated LC) correlated to the old active LC, the TPA 38 transfers all or a portion of the old active LC's bandwidth reservation to its correlated LC and the row entry <KEY, LCN$_{act}$, LCN$_{alt}$, Z> is removed from that TPA's correlation table 39. When the bandwidth requirement of the alternate path (BWR$_{alt}$ 47) of Z bits/s is greater than or equal to the bandwidth requirement for the formerly active path of X bits/s, the TPA 38 transfers all of the old active LC's bandwidth reservation of X bits/s to its correlated LC. When X is greater than Z, the TPA 38 only transfers a portion of the old active LC's bandwidth reservation of X bits/s to its correlated LC, this portion being equal to Z bits/s. The teardown packet is then forwarded to the next TPA 38 where the process is repeated until the teardown packet reaches the destination node. FIG. 12 is a flowchart of the transfer stage of the present invention.

Figure 13:
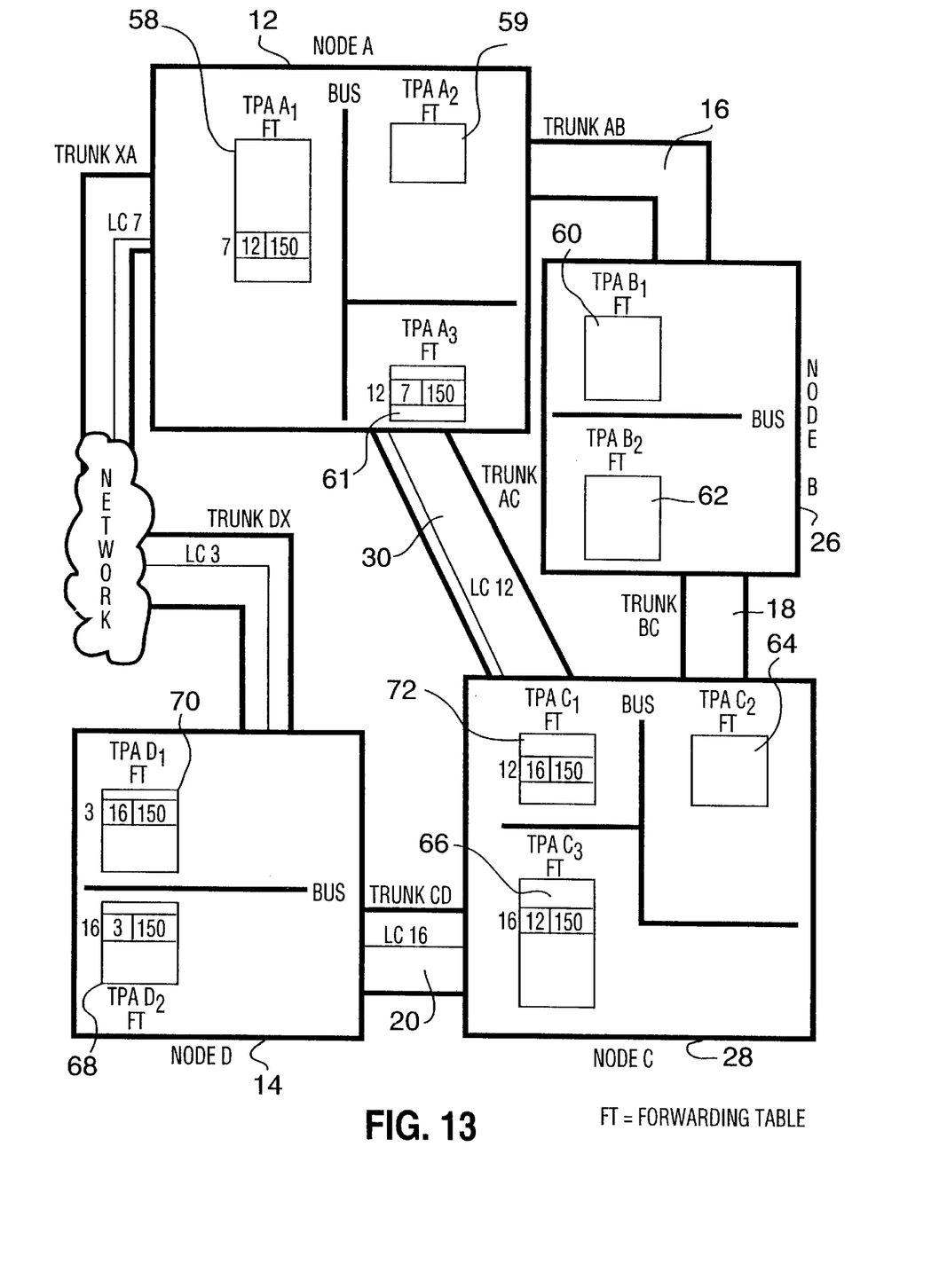
FIG. 13 is a block diagram of the set of nodes ABCD after the transfer stage, but illustrating more detail than FIG. 3.

Referring to FIG. 11, the teardown packet (not shown) is received by TPA C$_2$ 103 on node C 28. Since this packet travelled on LC 6 of trunk BC 18, TPA C$_2$ 103 deallocates LC 6. TPA C$_2$ 103 then searches its correlation table 88 to find whether there is some LC correlated to LC 6. Since there is none, the 100 bits/s of reserved bandwidth is released for LC 6 and the teardown packet is forwarded to TPA C$_3$ 82 with header containing LCN=24. TPA C$_2$ 103 also removes the row entry <KEY, 6, NONE, NONE> from its correlation table 88. When the teardown packet is received by TPA C$_3$ 82, TPA C$_3$ 82 deallocates LC 24. It then searches its correlation table 98 to find whether there is some LC correlated to LC 24. Since LC 16 had been correlated to LC 24, and X=100 bits/s, Z=150 bits/s, and thus Z>X, TPA C$_3$ 82 transfers 100 bits/s of bandwidth reserved by LC 24 to LC 16 and the row entry <KEY, 24, 16, 150> is deleted from its correlation table 98. LCN=24 is then inserted into the teardown packet by TPA C$_3$ 82 and the teardown packet is then forwarded over LC 24 on trunk CD 20 to arrive at node D 14. Tearing down of the old active path at node A 12, node B 26 and node D 14 follows the same pattern. After the transfer stage is complete, the TPA forwarding tables 58 59 60 61 62 64 66 68 70 and 72 are as illustrated in FIG. 13. The omission of correlation tables in this figure implies they are empty.

Even with bandwidth correlation mechanism, the establishment of an alternate path in a connection-oriented network may fail somewhere along the alternate path's route. Such failure may be due to a lack of network resources or a failure of some network component. For example, referring to FIG. 9 which shows the state of the network after the keying stage and just before the establishment of the alternate path ACD, assume trunk AC 30 has no available bandwidth. When the alternate path setup packet is received by TPA A$_3$ 104 during the correlation stage, TPA A$_3$ 104 has to reject this setup because its trunk AC 30 has no bandwidth free thus TPA A$_3$ 104 cannot reserve the required amount of bandwidth for the alternate path. This rejection will cause the failure in alternate path establishment and ultimately will cause path optimization and/or path bandwidth requirement adjustment to be aborted for the active path. This ultimately means that the transfer stage will never occur because of the unsuccessful correlation stage. Since the keying stage results in a row entry being added to a TPA's correlation table, unless these row entries are deleted, the finite capacity of the correlation table would eventually be exceeded, resulting in the TPA being unable to subsequently key other active LCs, and therefore being unable to correlate these LCs with alternate LCs. This ultimately would result in a TPA attempting to reserve the required amount of bandwidth for the alternate path without correlation, provided there is sufficient free bandwidth available. If the required amount of bandwidth is unavailable, path optimization and/or path bandwidth requirement adjustment will be aborted.

A mechanism was thus added to allow for key expiration. If the correlation stage does not occur after a set time interval following the keying stage, the row entry corresponding to an active LC is removed from the correlation table. This is referred to hereinafter as "unkeying". Referring to FIG. 7, unkeying is only done if the row entry corresponding to an active LC with LCN=LCN$_{act}$ 74 has the LCN$_{alt}$ 76 with a value of NONE. This is because an active LC can only be unkeyed provided there is no alternate LC correlated to it. This is necessary due to the fact that the alternate LC only reserves a portion of its bandwidth requirement (BWR$_{alt}$ 47) and relies on the transfer stage to receive the remainder of its bandwidth requirement from the bandwidth reservation of the active LC. If an active LC was unkeyed while an alternate LC was correlated to it, there would be no way to transfer the bandwidth reservation from the active LC to the alternate LC. This would ultimately result in a newly active path having a bandwidth reservation that is incorrect. It is the responsibility of TPAs to monitor their correlation tables and unkey active LCs when necessary.

Because TPAs cannot unkey active LCs when some alternate LCs are correlated to the active LCs, the time interval between the keying and unkeying of the active LCs should be long enough to allow alternate path setup packets to reach these TPAs following the keying of the active LCs by these TPAs. That is, assuming the correlation stage immediately follows the keying stage and the length of the keying and correlation stages in an uncongested network is 50 miliseconds, the time interval between the keying and unkeying of active LCs can be set as low as 50 miliseconds. To account for congestion, a more realistic value for this time interval is a few seconds.

We claim:

1. A connection-oriented packet switching network including a plurality of switching nodes interconnected by transmission links, and in which data packets are transmitted on an active path between a source node and a destination node wherein bandwidth is allocated by means of a bandwidth reservation on all transmission links between said source node and said destination node for said active path, said connection-oriented packet switching network comprising:

means for allocating bandwidth to an alternate path between said source node and said destination node such that on all transmission links common to both said active path and said alternate path the bandwidth allocation for said active path is shared with said alternate path without a double reservation of bandwidth for said alternate path; and means for transferring said shared bandwidth allocation from said active path to said alternate path.

2. A connection-oriented packet switching network including a plurality of switching nodes interconnected by transmission links, and in which data packets are transmitted on an active path between a source node and a destination node wherein bandwidth is allocated on all transmission links between said source node and said destination node for said active path, said connection-oriented packet switching network comprising:

means for allocating bandwidth to an alternate path between said source node and said destination node such that on all transmission links common to both said active path and said alternate path the bandwidth allocation for said active path is shared with said alternate path;

means for transferring said shared bandwidth allocation from said active path to said alternate path, and wherein routing data and bandwidth allocation data for said alternate path are correlated to routing data and bandwidth allocation data for said active path by means of a key transmitted to, and stored at each of said switching nodes.

3. The connection-oriented packet switching network of claim 1 wherein said means for transferring said shared bandwidth allocation from said active path to said alternate path does so simultaneously while said active path is torn down.

4. The connection-oriented packet switching network of claim 1 wherein said active path and said alternate path are established by means of a setup packet being transmitted from said source node to said destination node.

5. The connection-oriented packet switching network of claim 2 wherein said routing data and said bandwidth allocation data are stored in a trunk path administrator maintained at each of said switching nodes.

6. The connection-oriented packet switching network of claim 5 wherein said trunk path administrator contains a forwarding table where said routing data and said bandwidth allocation data for said active path are stored and associated with each other, and where said routing data and said bandwidth allocation data for said alternate path are stored and associated with each other, and a correlation table where said key, said routing data for said active path and said routing data for said alternate path are stored and associated with each other.

7. The connection-oriented packet switching network of claim 6 wherein said correlation table contains data for the bandwidth requirements of said alternate path.

8. The connection-oriented packet switching network of claim 6 wherein the deletion of said key can be initiated by said trunk path administrator after a pre-determined time.

9. A method of establishing an alternate path between a source node and a destination node in a connection-oriented packet-switching network including a plurality of switching nodes interconnected by transmission links, and in which data packets are transmitted on an active path between said source node and said destination node wherein bandwidth is allocated by means of a bandwidth reservation on all transmission links between said source node and said destination node on said active path comprising the steps of:

sharing the bandwidth allocation from said active path with said alternate path without a double reservation of bandwidth for said alternate path on all transmission links common to both said active path and said alternate path; and transferring the bandwidth allocation of said active path to said alternate path on all transmission links common to both said active path and said alternate path.

10. A method of establishing an alternate path between a source node and a destination node in a connection-oriented packet-switching network including a plurality of switching nodes interconnected by transmission links, and in which data packets are transmitted on an active path between said source node and said destination node wherein bandwidth is allocated on all transmission links between said source node and said destination node on said active path comprising the steps of:

sharing the bandwidth allocation from said active path with said alternate path on all transmission links common to both said active path and said alternate path;

transferring the bandwidth allocation of said active path to said alternate path on all transmission links common to both said active path and said alternate path; and wherein the step of sharing said bandwidth allocation comprises the steps of:
transmitting a key to each of said switching nodes;
storing said key at each of said switching nodes;
associating said key with routing data and bandwidth allocation data for said active path with routing data and bandwidth allocation data for said alternate path.

11. The method of claim 10 further comprising the step of tearing down said active path while simultaneously transferring said bandwidth allocation from said active path to said alternate path.

12. A method of establishing an alternate path between a source node and a destination node in a connection-oriented packet switching network including a plurality of switching nodes interconnected by transmission links, and in which data packets are transmitted on an active path between said source node and said destination node wherein bandwidth is allocated on all transmission links between said source node and said destination node for said active path comprising the steps of:

keying the transmission links of said active path wherein a key is transmitted to and stored at each of said switching nodes;

correlating routing data and bandwidth allocation data of said alternate path with the routing data and bandwidth allocation data of said active path; and, transferring said bandwidth allocation data from said active path to said alternate path on all transmission links common to both said active path and said alternate path.

* * * * *